United States Patent [19]

Swanson, Jr.

[11] Patent Number: 5,693,407
[45] Date of Patent: Dec. 2, 1997

[54] FLEXIBLE TRANSPARENT HOLOGRAPHIC LAMINATE

[76] Inventor: Stanley R. Swanson, Jr., 265 Zenith Ave., Lafayette, Colo. 80501

[21] Appl. No.: 583,602

[22] Filed: Jan. 5, 1996

[51] Int. Cl.$^6$ ........................................... B32B 3/00
[52] U.S. Cl. .................. 428/195; 428/203; 428/204; 428/209; 428/221; 428/323; 428/411.1; 428/423.1; 428/446; 428/458; 428/475.5; 428/480; 428/500; 283/94
[58] Field of Search ................. 430/1; 283/86, 283/901, 94; 359/1; 428/14, 203, 195, 204, 209, 221, 323, 411.1, 423.1, 446, 458, 475.5, 480, 500

[56] References Cited

U.S. PATENT DOCUMENTS

| | | |
|---|---|---|
| 4,702,955 | 10/1987 | Allred et al. . |
| 4,769,265 | 9/1988 | Coburn, Jr. . |
| 4,868,033 | 9/1989 | Nakano et al. . |
| 4,956,040 | 9/1990 | Fry ............................ 156/267 |
| 4,971,646 | 11/1990 | Schell et al. . |
| 5,073,222 | 12/1991 | Fry ............................ 156/267 |
| 5,091,232 | 2/1992 | Coburn, Jr. . |
| 5,223,357 | 6/1993 | Lovison . |
| 5,281,499 | 1/1994 | Bussard ......................... 430/1 |
| 5,314,767 | 5/1994 | Bussard ......................... 430/1 |
| 5,427,378 | 6/1995 | Murphy . |
| 5,455,129 | 10/1995 | Bussard ......................... 430/1 |

Primary Examiner—William Krynski
Attorney, Agent, or Firm—Watson Cole Stevens Davis, P. L. L. C.

[57] ABSTRACT

In a first form, a layer of flexible transparent holographic film is coated on one side and a flexible open mesh scrim is disposed between the coating and a layer of flexible transparent reinforcing material. The scrim is secured to the coating and the reinforcing material by a flexible transparent adhesive. A second form is similar to the first form and has a second open mesh scrim disposed between the coating and layer of flexible transparent material and disposed adjacent the first scrim. A third form has two spaced layers of flexible transparent material with a scrim disposed therebetween and held in place by a flexible transparent adhesive; and the scrim has scrim members including threads of holographic material. A fourth form has two spaced layers of flexible transparent material with a scrim disposed therebetween and held in place by a flexible transparent adhesive; and particles of holographic film are disposed between the pair of layers.

17 Claims, 2 Drawing Sheets

U.S. Patent    Dec. 2, 1997    Sheet 1 of 2    5,693,407
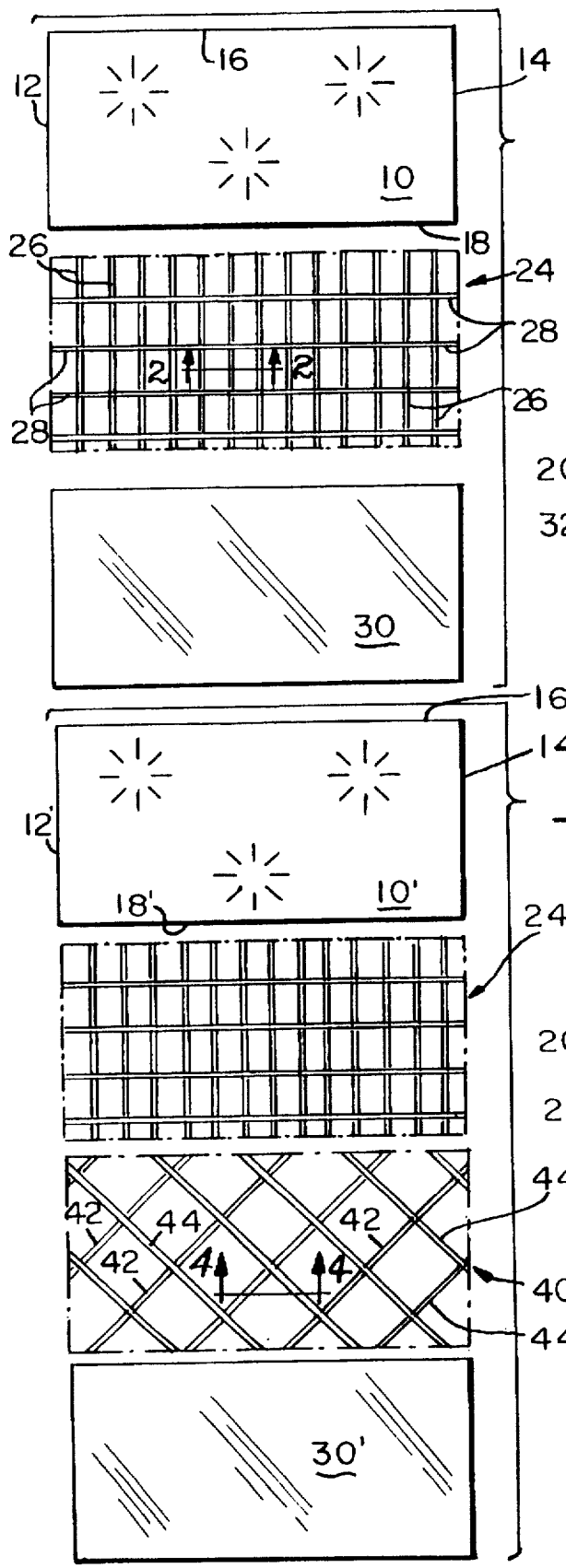
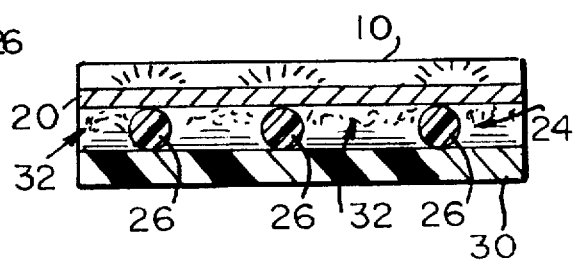
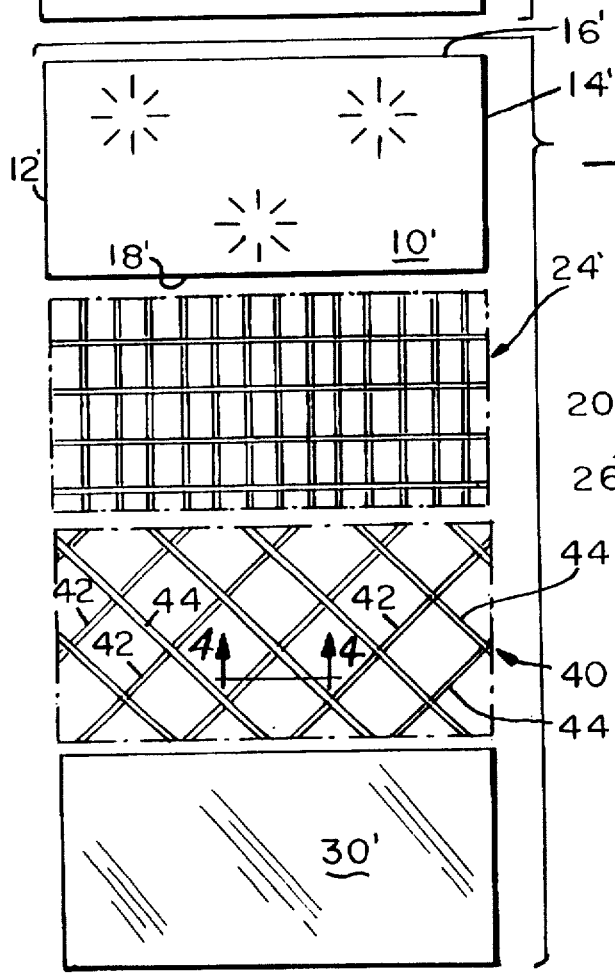
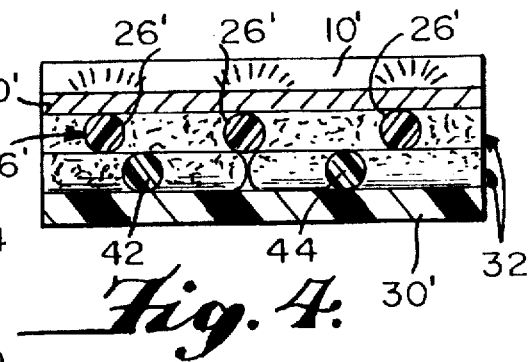
Fig. 1.
Fig. 2.
Fig. 3.
Fig. 4.

FLEXIBLE TRANSPARENT HOLOGRAPHIC LAMINATE

BACKGROUND OF THE INVENTION

The present invention relates to a laminate especially adapted for use in the construction of articles such as sails for sailboats windsurfers and land sailers as well as in the construction of kites, banners, flags and the like.

These articles are generally used outdoors where they are subjected to wind as well as the rays of the sun. The laminate must therefore be flexible so as to move with the wind. It is also desirable that the laminate provide an attractive color pattern when struck by the sun's rays irrespective of the direction from which the rays come.

In the prior art, multiple panels of color dyed materials have been used to create the desired visual effect. These constructions suffer from the disadvantage that there is a loss of color intensity due to breakdown of the dyes in the material caused by ultraviolet radiation. Prior laminates used in the articles discussed above either use no colors at all or a dyed adhesive or a dyed film. None of these laminates offers the desired intensity of color.

SUMMARY OF THE INVENTION

The present invention employs holographic material to obtain a prismatic effect which results in the desired color pattern. In all forms of the invention, the laminate includes surfaces which produce the color pattern; and these surfaces are protected from damage by adjacent portions of the laminate so that the surfaces will continue to be effective while the laminate is in use in unfriendly environments. No dyes are used so that there is no loss of color intensity due to ultraviolet radiation, thereby ensuring that high intensity of color is obtained.

The invention employs materials all of which are flexible to provide a laminate which is sufficiently flexible so as to move with the wind. In addition, all of the materials which are used are transparent except for metallized coating portions or open mesh scrims. The scrims may be opaque or translucent, but even when they are opaque, the open mesh construction of the scrims ensures that the surface area of the laminate which is not covered by the scrim members and therefore which is transparent is sufficient to provide the desired color effect. This enables the rays of the sun to readily pass through the laminate from either side thereof to provide the color pattern which is perceived by the human eye. The holographic film of the invention may also be partially coated by a material which is not transparent, the density of the coating being selected to ensure that the laminate is sufficiently transparent to provide the desired effect.

In order to provide the desired color pattern, a modified laminate may incorporate a scrim comprising a plurality of scrim members including threads of holographic material. In another form of the invention, a plurality of particles of holographic film are employed to provide the color pattern.

The laminate is reinforced by at least one layer of reinforcing material, and in some forms of the invention by two such layers. The scrims add additional resistance to tearing of the laminate. Accordingly, the laminate of the invention has good strength and durability as well as good tear resistance. Additionally, the laminate of the invention can be sewn when desired.

BRIEF DESCRIPTION OF THE DRAWINGS

FIG. 1 is an exploded schematic view of the components of a first form of the invention;

FIG. 2 is a cross-section taken along line 2—2 of FIG. 1 showing a portion of the finished product of the first form of the invention after the components of FIG. 1 have been assembled in operative relationship;

FIG. 3 is an exploded schematic view of the components of a second form of the invention;

FIG. 4 is a cross-section taken along line 4—4 of FIG. 3 showing a portion of the finished product of the second form of the invention after the components of FIG. 3 have been assembled in operative relationship;

DESCRIPTION OF THE PREFERRED EMBODIMENT

Figure 5:
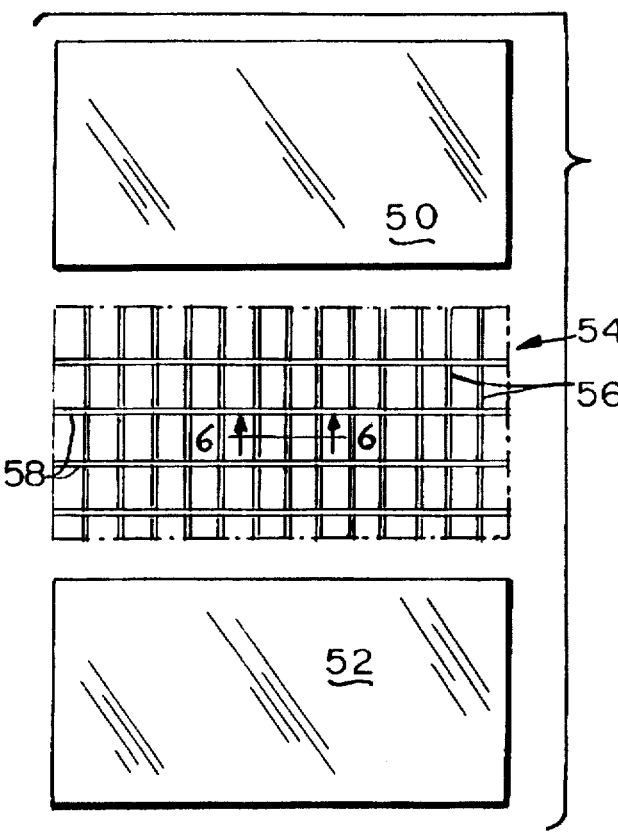
FIG. 5 is an exploded schematic view of the components of a third form of the invention.

Referring now to the drawings wherein like reference characters designate corresponding parts throughout the several views, a first form of the invention is shown in FIGS. 1 and 2 including a flexible transparent sheet 10 of holographic film having side edges 12 and 14 and longitudinal edges 16 and 18. The holographic film is a commercially available product comprising a clear film made, for example, of polyester, polypropylene, vinyl or nylon, which has a suitable pattern embossed on one side of the film. After the film is embossed, it is provided with a transparent coating 20 which is applied to the embossed side of the film. The coating defines or highlights the embossed pattern and enables the desired prismatic effect to be obtained in the finished product by allowing the film to be further processed with adhesive without the adhesive filling in and nullifying the embossed portions.

Coating 20 is flexible and may comprise a partially metallized coating wherein powdered metal, usually aluminum, is applied to the film in a vacuum. The density of the metallized coating is selected so that the visible light transmission (VLT) is in the range of about 50 percent to about 80 percent, and preferably in the range of about 60 percent to about 70 percent to ensure that the laminate is sufficiently transparent to provide the desired effect. The coating may also comprise a high diffraction index material such as silicon dioxide which is applied to the film in a vacuum. This latter material provides better results, but it is very expensive at the present time.

A preformed flexible open mesh scrim 24 is formed of a natural fiber or a synthetic fiber material such nylon, polyester, aramid, polyethylene, polypropylene, SPECTRA sold by Allied Signal, Inc., or any combination of these fibers. The sides of the scrim as illustrated in FIG. 1 and the sides of the scrims shown in the other embodiments of the invention are indicated by phantom lines to indicate that the scrim is cut from a larger sheet of open mesh material, the phantom lines indicating that the scrim fits within a rectangular envelope having the same outer dimensions as sheet 10. The scrim includes warp members 26 which extend substantially parallel to the sides of sheet 10 in the finished product. The scrim also includes weft members 28 which extend substantially perpendicular to the warp members. The warp and weft members of the scrim may be woven or knitted, or as shown, may be laid upon one another and secured to one another by an adhesive bond where the members cross.

The scrim members may be translucent or opaque, but the open mesh construction is such that the scrim members cover up to about 75 percent of the surface area of the laminate, but preferably cover about 10 percent to about 25 percent of the surface area of the laminate thereby ensuring that light rays can readily pass through the scrim in the finished product.

A sheet of flexible transparent reinforcing material 30 is preferably formed of the same material as the holographic film, and is simply a clear sheet of material which is not embossed or otherwise treated. It is provided for the purpose of reinforcing the finished laminate and to protect the scrim and coating on the holographic film.

A flexible transparent adhesive means 32 is disposed between the coating 20 and reinforcing layer 30, the adhesive means filling the space between the coating and reinforcing layer except for the space taken up by the scrim and serving to bond the scrim to the coating and the reinforcing layer. The adhesive means is preferably an aliphatic thermoset polyurethane, such as MORTON ADCOTE 122 sold by Morton International, Inc., Chicago, Ill., which provides good bond integrity and durability and is suitable for outdoor applications. The adhesive means may also be, for example, an aliphatic thermoplastic material. The adhesive application weight is preferably in the range of about 0.30 to about 0.65 ounces per square yard of laminate.

The thickness of the sheets 10 and 30 as well as the scrim are preferably in the range of about 0.25 mil to about 2 mil and may be somewhat thicker in some cases such as when used as sails on sailboats. Coating 20 may be very thin as is well-known in the art.

The methods for laminating the components together to provide the finished product shown in FIGS. 2, 4, 6 and 8 are standard techniques well-known in the laminating art.

Referring to FIGS. 3 and 4, a second form of the invention is provided which is similar to that shown in FIG. 1 with the exception that an additional scrim has been added to the laminate. The components of the laminate shown in FIGS. 3 and 4 which are similar to those shown in FIG. 1 have been given the same reference numerals primed. In other words, components 10', 24' 30' and adhesive means 32' are similar to components 10, 24, 30 and adhesive means 32 shown in FIGS. 1 and 2.

In the second form of the invention, an additional flexible transparent open mesh scrim 40 is provided. This additional scrim may be formed of the same materials as discussed in connection with scrim 24, and may be of the same material as scrim 24' or a different material. Scrim 40 includes scrim members 42 and 44 which extend at substantially 45 degree angles to the side edges 12' and 14' of the film 10' and extend at substantially 90 degrees to one another in the finished laminate. The scrim members may extend at other angles to the side edges of the film if desired. The open mesh construction of scrim 40 is such that scrim members 42 and 44 may cover up to about 75 percent of the surface area of the laminate, but preferably cover between about 10 percent and about 25 percent of the surface area of the laminate to ensure that light readily passes through the scrim. Scrim 40 is disposed between and in contact with the scrim members of scrim 24' and reinforcing member 30'.

In this form of the invention, the adhesive means 32' fills the space between the coating 20' and reinforcing member 30' except for the space taken up by the scrims and serves to bond scrim 24' to coating 20', the second scrim 40 to reinforcing member 30' and further to secure scrims 24' and 40 to one another. Scrim 24' provides good tear resistance in the warp and weft directions of the scrim members 26' and 28' in the finished laminate, while scrim 40 provides good tear resistance in the bias or 45 degree direction of the finished laminate.

Figure 6:
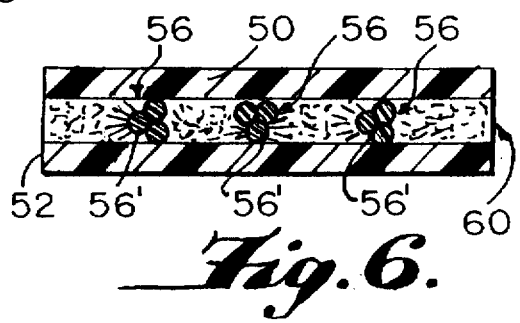
FIG. 6 is a cross-section taken along line 6—6 of FIG. 5 showing a portion of the finished product of the third form of the invention after the components of FIG. 5 have been assembled in operative relationship.

Referring to FIGS. 5 and 6, a third form of the invention is shown. A pair of spaced sheets of flexible transparent material 50 and 52 serve as reinforcing members and may be formed of the same materials as reinforcing member 30. A flexible transparent open mesh scrim 54 is disposed between sheets 50 and 52. Scrim 54 includes scrim members 56 and 58. The open mesh construction of scrim 54 is such that scrim members 56 and 58 may cover up to about 75 percent of the surface area of the laminate, but preferably cover between about 10 percent and about 25 percent of the surface area of the laminate to ensure that light readily passes through the scrim.

As seen in FIG. 6, each of scrim members 54 includes a plurality of threads 56 shown as being three in number, one of these threads 56' being a thread formed of holographic material, while the other two threads may be formed of the same material as discussed previously in connection with scrim 24. It is apparent that the number of threads may be varied, but is important that at least one of these threads be formed of holographic material in order to obtain the desired color pattern in the finished laminate.

Flexible transparent adhesive means 60 similar to that previously described is disposed between the pair of sheets 50 and 52, filling the space except for scrim 54 and securing the scrim to sheets 50 and 52.

Figure 7:
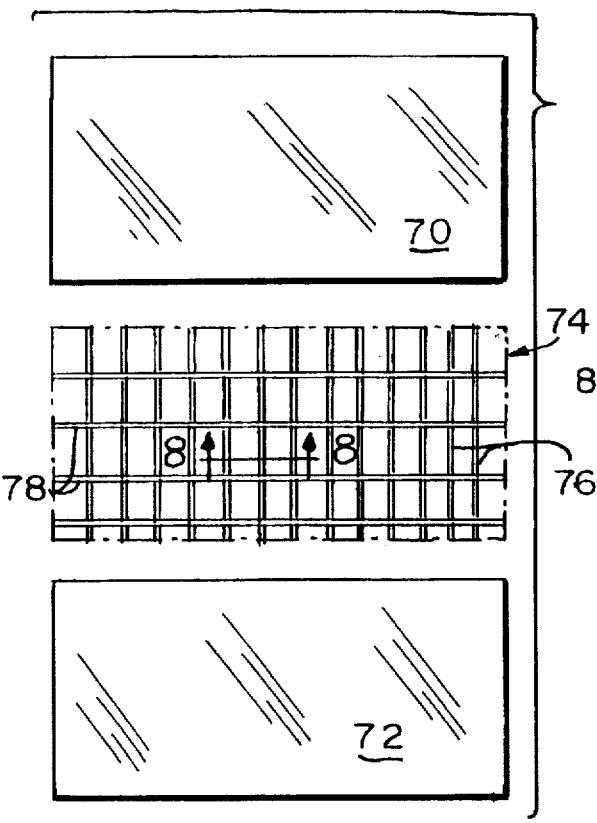
FIG. 7 is an exploded schematic view of the components of a fourth form of the invention.
Figure 8:
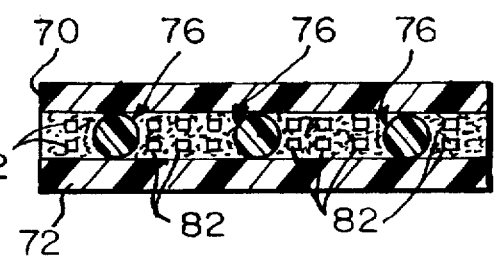
FIG. 8 is a cross-section taken along line 8—8 of FIG. 7 showing a portion of the finished product of the fourth form of the invention after the components of FIG. 7 have been assembled in operative relationship.

Referring to FIGS. 7 and 8, a pair of spaced sheets of flexible transparent material 70 and 72 serve as reinforcing members and may be formed of the same materials as reinforcing member 30. A flexible transparent open mesh scrim 74 is disposed between sheets 50 and 52 and is similar in construction to scrim 26. Scrim 74 includes scrim members 76 and 78. The open mesh construction of scrim 74 is such that scrim members 76 and 78 may cover up to about 75 percent of the surface area of the laminate, but preferably cover between about 10 percent and about 28 percent of the surface area of the laminate to ensure that light readily passes through the scrim.

Flexible transparent adhesive means 80 similar to that previously described is disposed between the pair of sheets 70 and 72, filling the space except for scrim 74 and securing the scrim to sheets 70 and 72.

A plurality of particles 82 formed of holographic film are disposed between the sheets 70 and 72 for providing an attractive color pattern. The particles, sometimes referred to as "glitter" are produced from holographic film which may be coated with a high diffraction index coating or may be fully or partially metallized such that the particles are either partially light transmissive, or not. Commercially available glitter products such as SPECTRATEK HOLOFLAKE GLITTER sold by Spektratek, Los Angeles, Calif., with a particle size of 1/64 inch square can be used as long as the particles have the desired prismatic properties.

Particles 82 may be incorporated into the laminating process by mixing them into the wet adhesive system to disperse the particles, then coating the adhesive with the particles therein onto a base film through direct or offset gravure printing, knife/roll, reverse roll coating, or any other known method. After coating, the adhesive with the particles therein can be dried in an oven. It could then be dry combined with the reinforcing scrim during the laminating process. The particles could also be sintered onto an adhesive coated film after the adhesive has dried and combined with the scrim.

By varying the amount of particles in the adhesive, the density of color producing particles can be varied to produce the desired effect while incorporating a minimum number of particles. The number of particles is chosen such that the density of the particles provides visible light transmission (VLT) in the range of about 50 percent to about 80 percent, and preferably in the range of about 60 percent to about 70 percent thereby providing the desired prismatic and optical clarity while reducing the cost of construction and keeping the weight of the laminate to a minimum.

The invention has been described with reference to a preferred embodiment. Obviously, various modifications, alterations and other embodiments will occur to others upon reading and understanding this specification. It is our intention to include all such modifications, alterations and alternate embodiments insofar as they come within the scope of the appended claims or the equivalent thereof.

What is claimed is:

1. A flexible transparent-holographic laminate comprising a layer of flexible transparent holographic film having opposite sides, a coating disposed on one side of said layer of holographic film, a layer of flexible transparent reinforcing material, a flexible open mesh scrim disposed between said coating and said layer of reinforcing material, and a flexible transparent adhesive disposed between said coating and said layer of reinforcing material for adhesively securing said scrim to said coating and said layer of reinforcing material.

2. A laminate as defined in claim 1 wherein said coating is a partially metallized coating.

3. A laminate as defined in claim 2 wherein said metallized coating has a density which provides visible light transmission in the range of about 50 percent to about 80 percent.

4. A laminate as defined in claim 1 wherein said coating comprises silicon dioxide.

5. A laminate as defined in claim 1 wherein said holographic film is made from a material selected from the group consisting of polyester, polypropylene, vinyl and nylon.

6. A laminate as defined in claim 1 wherein said scrim is made from a material selected from the group consisting of nylon, polyester, aramid, polyethylene, and polypropylene.

7. A laminate as defined in claim 1 wherein said adhesive comprises aliphatic thermoset polyurethane.

8. A laminate as defined in claim 1 wherein the weight of said adhesive is in the range of about 0.30 to about 0.65 ounces per square yard.

9. A laminate as defined in claim 1 wherein said scrim includes scrim members covering up less than about 75 percent of the surface area of said laminate.

10. A flexible transparent holographic laminate comprising a layer of flexible transparent holographic film having opposite sides, a coating disposed on one side of said layer of holographic film a layer of flexible transparent reinforcing material, a first flexible open mesh scrim disposed adjacent said coating, a second flexible open mesh scrim disposed adjacent said layer of reinforcing material, said first and second scrims being disposed adjacent one another, and flexible transparent adhesive disposed between said coating and said layer of reinforcing material for adhesively securing said first scrim to said coating, said second scrim to said layer of reinforcing material and said first and second scrims to one another.

11. A laminate as defined in claim 1 wherein said laminate has side edges, said first scrim including scrim members extending substantially parallel to said side edges and substantially perpendicular to said side edges, said second scrim including members extending at an acute angle to said side edges.

12. A flexible transparent holographic laminate comprising a pair of layers of flexible transparent material, a flexible open mesh scrim disposed between said layers of material, and a flexible transparent adhesive disposed between said pair of layers for adhesively securing said scrim to said layers of material, said scrim comprising a plurality of scrim members including threads of holographic material for providing a color pattern.

13. A flexible transparent holographic laminate comprising a pair of layers of flexible transparent material, a flexible open mesh scrim disposed between said layers of material, a flexible transparent adhesive disposed between said pair of layers for adhesively securing said scrim to said layers of material, and a plurality of particles of holographic film disposed between said pair of layers and supported by said adhesive for providing a color pattern.

14. A laminate as defined in claim 13 wherein said particles have a coating on one side thereof.

15. A laminate as defined in claim 14 wherein said coating is a metallized coating.

16. A laminate as defined in claim 14 wherein said coating comprises silicon dioxide.

17. A laminate as defined in claim 13 wherein the density of said particles provides visible light transmission in the range of about 50 percent to about 80 percent, and preferably in the range of about 60 percent to about 70 percent.

* * * * *